(12) United States Patent
Ichihara

(10) Patent No.: US 10,663,701 B2
(45) Date of Patent: May 26, 2020

(54) ASPHERICAL CEMENTED LENS

(71) Applicant: Jun Ichihara, Osaka (JP)

(72) Inventor: Jun Ichihara, Osaka (JP)

( * ) Notice: Subject to any disclaimer, the term of this patent is extended or adjusted under 35 U.S.C. 154(b) by 218 days.

(21) Appl. No.: 16/026,866

(22) Filed: Jul. 3, 2018

(65) Prior Publication Data

US 2019/0137740 A1 May 9, 2019

Related U.S. Application Data

(63) Continuation of application No. PCT/JP2016/067166, filed on Jun. 9, 2016.

(30) Foreign Application Priority Data

Mar. 9, 2016 (JP) ................. 2016-045636

(51) Int. Cl.
```
G02B 13/18    (2006.01)
G02B 21/02    (2006.01)
G02B 25/00    (2006.01)
G02B 3/00     (2006.01)
G02B 3/02     (2006.01)
G02B 13/00    (2006.01)
```

(52) U.S. Cl.
CPC .............. *G02B 13/18* (2013.01); *G02B 3/00* (2013.01); *G02B 3/02* (2013.01); *G02B 13/00* (2013.01); *G02B 13/0095* (2013.01); *G02B 21/02* (2013.01); *G02B 25/00* (2013.01); *G02B 25/001* (2013.01)

(58) Field of Classification Search
CPC ........ G02B 13/18; G02B 13/02; G02B 13/00; G02B 3/00; G02B 13/0095; G02B 21/02; G02B 25/00; G02B 25/001

USPC ....... 359/708, 718, 719, 796, 797, 798, 799, 359/800

See application file for complete search history.

(56) References Cited

U.S. PATENT DOCUMENTS

2015/0061064 A1* 3/2015 Baba .................... G02B 13/002
257/432

FOREIGN PATENT DOCUMENTS

JP  2006284620 A   10/2006
JP  2014067066 A   4/2014

OTHER PUBLICATIONS

International Search Report for corresponding App. No. PCT/JP2016/067166, dated Aug. 30, 2016.

(Continued)

*Primary Examiner* — Evelyn A Lester

(74) *Attorney, Agent, or Firm* — Renner, Otto, Boisselle & Sklar, LLP

(57) ABSTRACT

To provide an aspheric cemented lens which is easy to design and manufacture and has less aberration by using an inexpensive material such as a resin material. The aspheric cemented lens has at least three interfaces, when three interfaces are defined as a third interface, a second interface and a first interface in order from a light exit surface, chromatic aberration is corrected at the first interface and the second interface. The third interface is a hyperboloid or a surface close to a hyperboloid. When light is incident on the first interface parallel to the optical axis, the exit light from the third interface is converged to almost a single point. In order to correct chromatic aberration, the first interface and the second interface are curved surfaces.

4 Claims, 12 Drawing Sheets

(56) References Cited

OTHER PUBLICATIONS

Edmund Optics Japan Ltd. website (http://www.edmundoptics.jp/optics/optical-lenses/aspheric-lenses/precision-aspherized-achromatic-lenses/3405/), retrieved May 18, 2018 (cited in Specification).

* cited by examiner

Wave-optical MTF in aplanatic lens

FIG. 8(a) Present invention (ACC lens)
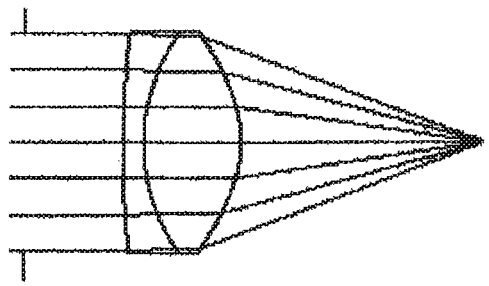
FIG. 8(b) Achromatic lens (#65-553)
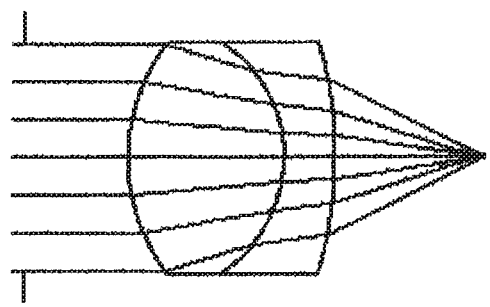
FIG. 8(c) Precise aspherical achromatic lens (#85-302)
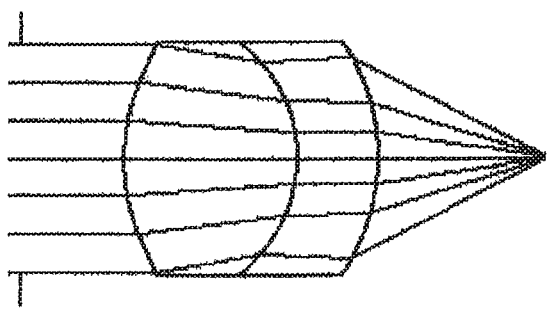

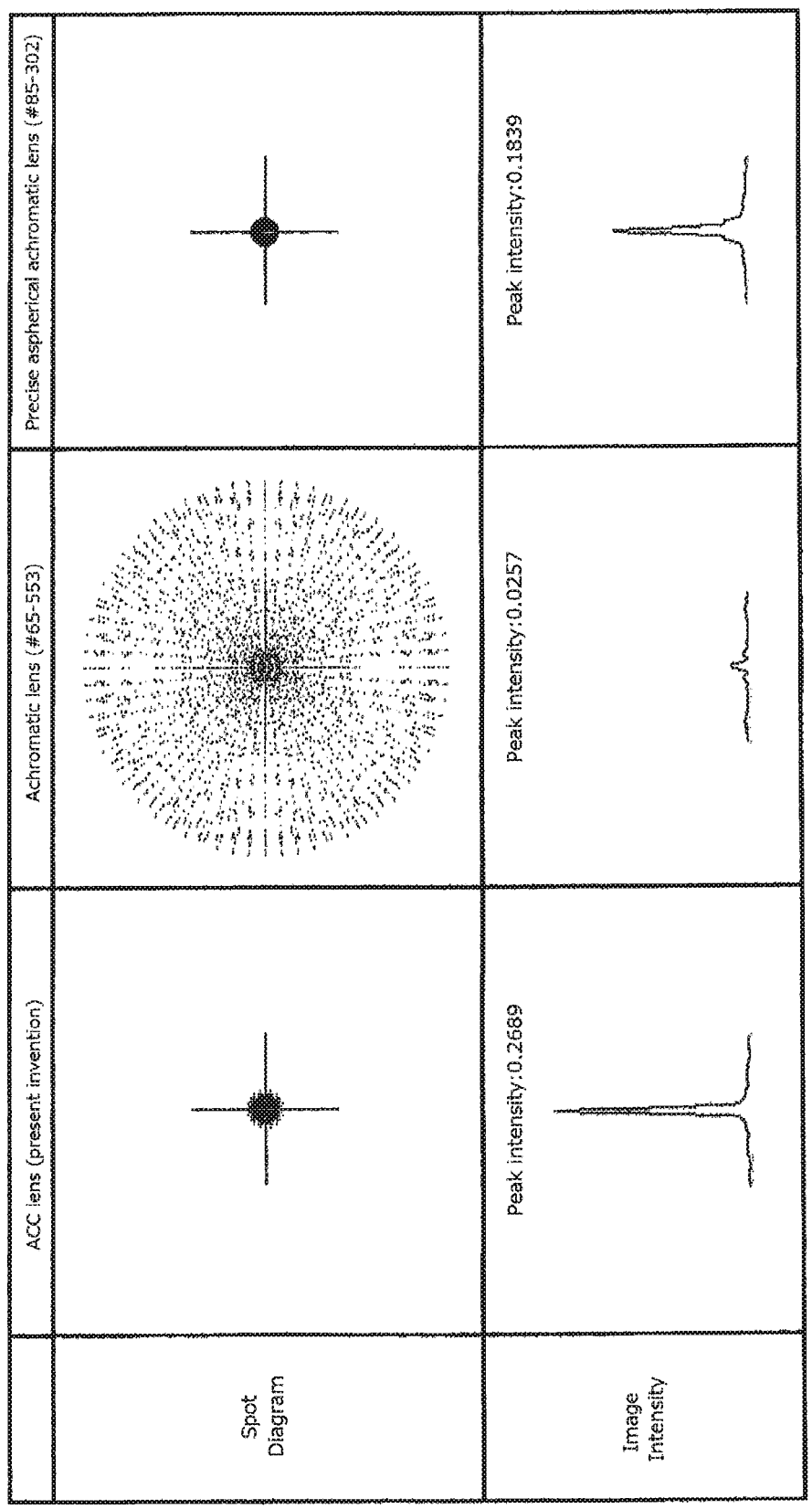

Ray diagram (0° and 5°)
FIG. 10(a) Relay lens with lenses of present invention (ACC lenses)
FIG. 10(b) Achromatic relay lens (#46-000)

Angle dependency of MTF
(Solod line: Sagittal direction;
Broken line: Meridional direction)
FIG. 11(a) Relay lens with lenses of present invention (ACC lenses)
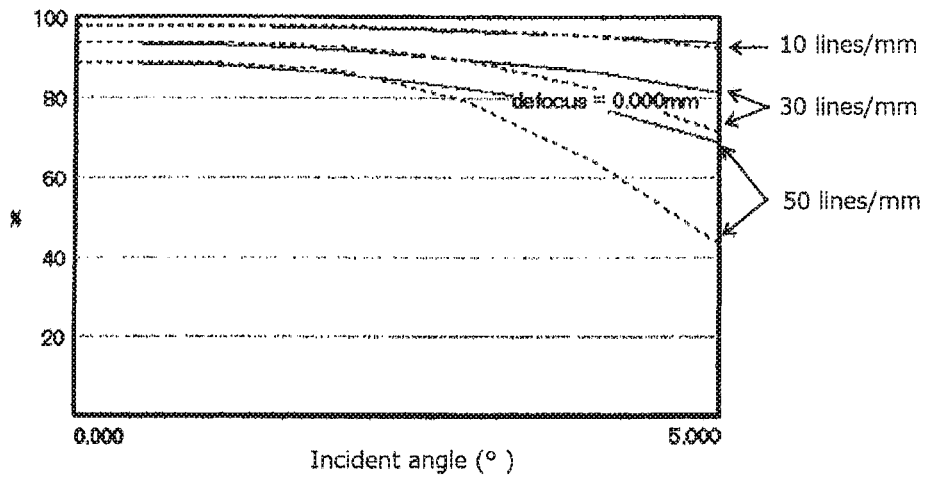
FIG. 11(b) Achromatic relay lens (#46-000)
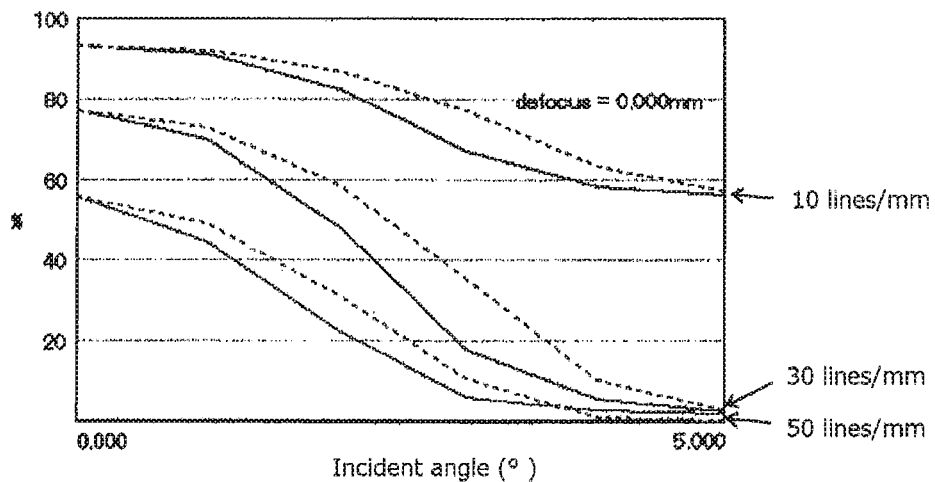
FIG.12
Ray diagram (0° and 5°)
Relay lens with lenses of present invention
(having spherical surfaces other than outermost surfaces)

FIG.13

Angle dependency of MTF
(Solid line: Sagittal direction;
Broken line: Meridional direction)

Relay lens with lenses of present invention
(having spherical surfaces other than outermost surfaces)

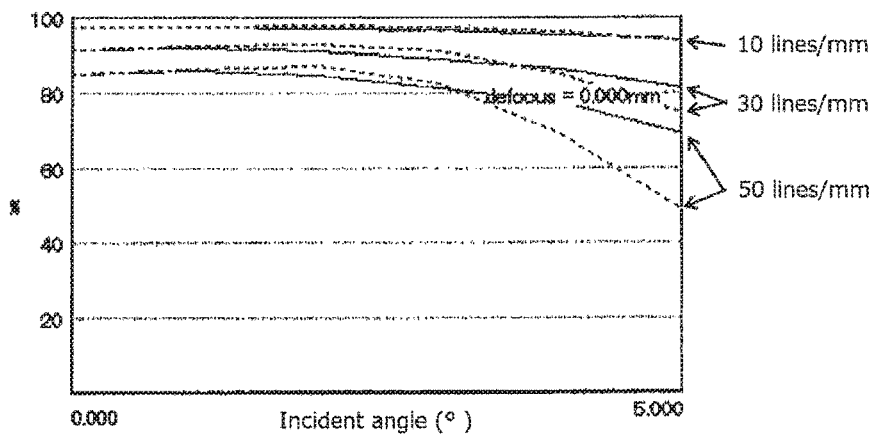

FIG.14

Ray diagram (0° and 5°)

Relay lens with lenses of present invention
(having BK7 at center)

FIG.15

Angle dependency of MTF
(Solid line: Sagittal direction;
Broken line: Meridional direction)

Relay lens with lenses of present invention
(having BK7 at center)

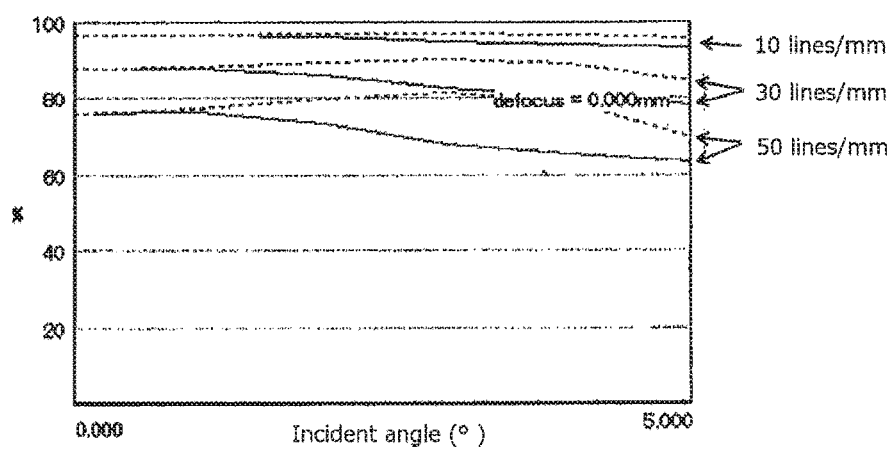

Estimation when magnification of zoom microscope of JP2013-92658 is set to be 30 times Ray diagram (0° and 20°) when light beam having diameter of 1 mm parallel to optical axis is incident on eyepiece lens from eye point

ASPHERICAL CEMENTED LENS

TECHNICAL FIELD

The present invention relates to an aspherical cemented lens having three or more substantial interfaces.

BACKGROUND ART

Conventionally, an achromatic lens which is configured by cementing two aspherical glass lenses is known (see Non-Patent Literature 1). The achromatic lens is designed to be suitable for a fluorescence microscope, a low S/N imaging application, or a biotechnology application, since the incident surface and the exit surface are respectively aspherical surfaces, for example, to favorably correct magnification chromatic aberration. However, it is very expensive because processing of the lens is difficult since it needs to process and to polish a glass lens into an aspheric surface having a complicated shape, and expensive glass having high refractive index and high dispersion characteristics is used.

CITATION LIST

Non-Patent Literature

[NPL 1]
Edmund Optics Japan Ltd. website (http://www.edmundoptics.jp/optics/optical-lenses/asphic-lenses/precision-aspheriz ed-achromatic-lenses/3405/)

SUMMARY OF THE INVENTION

Technical Problems

The present invention is purposed to provide an aspheric cemented lens which is easy to design and to manufacture and has less aberration with using inexpensive materials such as resin materials.

Solution of Problems

In order to achieve the above purpose, an aspherical cemented lens in accordance with the present invention is characterized by that:

the aspherical cemented lens comprises at least three interfaces;

when three interfaces are defined as a third interface, a second interface and a first interface in order from a light exit surface, the first interface and the second interface are curved surfaces;

when a main portion (a portion most contributing to convergence of light flux) of the third interface is approximated by a hyperbola, a radius of curvature of the hyperbola is defined as r3, a conic constant of the hyperbola is defined as k3, a refractive index in a region between the second interface and the third interfaces is defined as n3, a refractive index in a region behind the third interface (image side) is defined as n4, and a correction coefficient is defined as A, a portion of 65% or more of an effective region (a region through which the light flux passes) of the third interface is included in a scope between a hyperbola represented by a conic constant $k3'=k3\cdot(1-A)$ with a radius of curvature $r3$   (1), and a hyperbola represented by a conic constant $k3''=k3\cdot(1-A)$ with a curvature radius $r3$   (2), where $A=0.325\cdot(n4/n3-1)^2+0.0035$.

Further, it may be configured that when a light flux is incident on the first interface parallel to the optical axis, chromatic aberration is corrected at the first interface and the second interface, and the light beam is converged at the third interface, and MTF of a range of wavelength to be used becomes 60% or more at a spatial frequency of 10 lines/mm.

It may be configured that the first interface and the second interface are aspherical surfaces represented by only a radius of curvature and a conic constant and having no higher order aspherical coefficient.

It may be configured that a region between the first interface and the second interface is formed of polycarbonate (PC) and a region between the second interface and the third interface is formed of acrylic (PMMA).

Two of any one of the above-mentioned aspherical cemented lenses having the same configuration may be arranged symmetrically.

In addition, a microscope or a telescope may comprise an objective lens configured by symmetrically arranging two of any one of the above-mentioned aspherical cemented lenses having the same first configuration and an eyepiece lens configured by symmetrically arranging two of any one of the above-mentioned aspherical cemented lenses having the same second configuration different from the first configuration.

Advantageous Effects of the Invention

Since at least the third interface which is the exit surface is an aspherical surface, various aberrations such as spherical aberration can be corrected satisfactorily, and since the third interface is defined by only the radius of curvature r3 and the conic constant k3 with no complicated higher order aspherical coefficient, it is easy to design, and since the shape of the aspheric surface is simple, it is easy to be processed. Furthermore, when the chromatic aberration is corrected at the first interface and the second interface and the light beam is converged at the third interface, it is possible to manufacture an achromatic lens in which chromatic aberration is corrected satisfactory without using expensive materials.

BRIEF DESCRIPTION OF THE DRAWINGS

FIG. 8(a) is a diagram showing a basic configuration of the aspherical cemented lens in accordance with the present invention, and FIGS. 8(b) and 8(c) are diagrams showing configurations of a commercially available achromatic lens and a precise aspherical achromatic lens.

FIG. 9 is a graph showing spot diagrams representing focusing state and an image intensity curve of each lens shown in FIG. 8.

FIG. 10(a) is a diagram showing a configuration of a relay lens in which two aspherical cemented lenses in accordance with the present invention are arranged symmetrically, and FIG. 10(b) is a diagram showing a configuration of a commercially available achromatic relay lens.

FIG. 11(a) is a graph showing angle dependency of MTF of the relay lens in which two aspherical cemented lenses in accordance with the present invention are arranged symmetrically, and FIG. 11(b) is a graph showing angle dependence of MTF of the commercially available achromatic relay lens, FIG. 12 is a diagram showing a relay lens in which two aspherical cemented lenses in accordance with the present invention having spherical surfaces other than the outermost surface.

FIG. 13 is a graph showing angle dependency of MTF of the relay lens shown in FIG. 12.

FIG. 14 is a diagram showing a case where a region between two aspherical cemented lenses in accordance with the present invention is made of BK7.

FIG. 15 is a graph showing angle dependency of MTF of the relay lens shown in FIG. 14.

DESCRIPTION OF THE EMBODIMENTS

Figure 1:
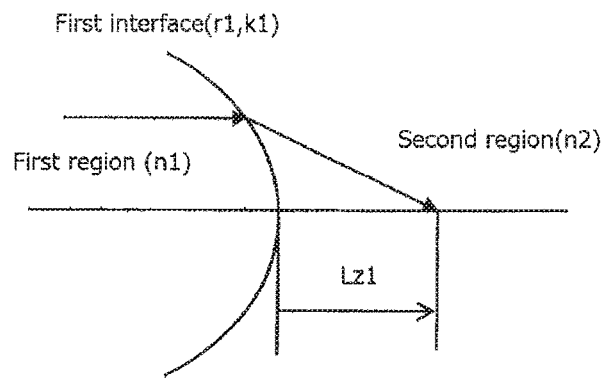
FIG. 1 is a diagram showing a designing method of an aspherical cemented lens in accordance with the present invention.

First, the designing method of the aspherical cemented lens in accordance with the present invention will be described. For converge a light flux parallel to the optical axis to a single point, a plano-convex lens having an exit surface as an aspherical surface is known. In such a case, the light flux is completely converged to a single point, in theory, the exit surface becomes hyperboloid, and the eccentricity "e" becomes equal to the refractive index "n" of the lens. Since there is a relation of $k=-e^2$ between the conic constant "k" and the eccentricity "e", it is understood as a conic curve of $k=-n^2$ (hereupon, it represents a surface of revolution made by rotating the conic curve about the central axis thereof, including paraboloid, hyperboloid, and ellipsoid of revolution). The inventor of the present invention has found that the following relationship exists, in general. With reference to FIG. 1, assuming that a refractive index of a first region is n1, a refractive index of a second region is n2, and an interface therebetween is a conic curve represented by a radius of curvature r1 and a conic constant k1, conditions to refract a light flux traveling in the first region parallel to the optical axis at the first interface and to converge the light flux to a single point distant a distance Lz1 from the interface in the second region is as follows.

$$r1 = Lz1 \cdot (n2-n1)/n2$$

$$k1 = -(n1/n2)^2$$

When the second region is air, since n2 nearly equal to "1", k1 becomes nearly equal to $-n1^2$, thus, the above equation is derived. Conversely, in order to make the light flux from a point light source parallel to the optical axis, when L1 is defined as a distance from the point light source to the first interface, the conditions are as follows.

$$r1 = L1 \cdot (n2-n1)/n1$$

$$k1 = -(n2/n1)^2$$

In addition, even when the distances Lz1 and L1 are negative, the above-mentioned equations are also established. When the distance Lz1 is negative, a virtual image is formed, and when the distance L1 is negative, the light flux converged to a point beyond the first interface is incident on the first interface.

Figure 2:
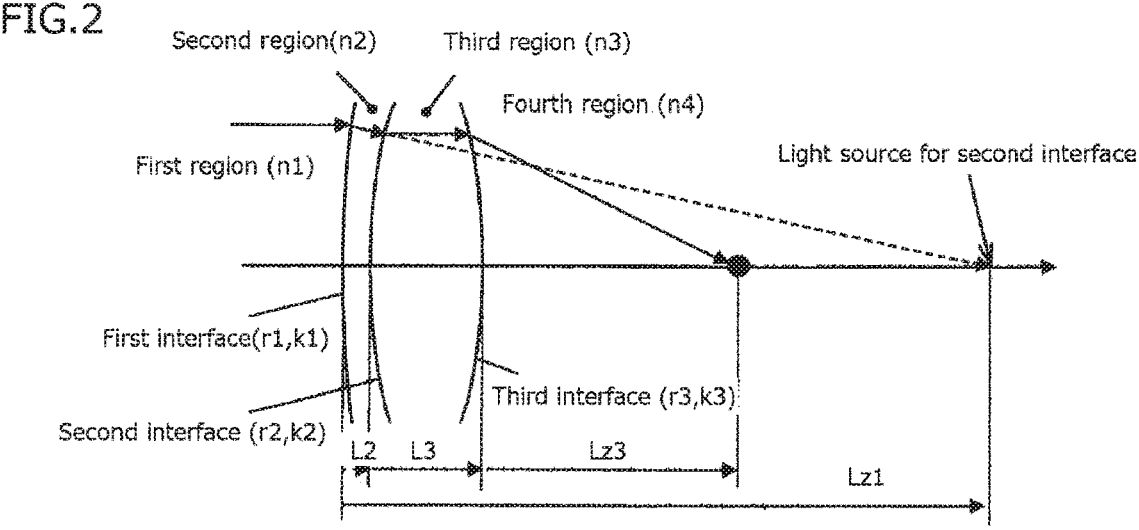
FIG. 2 is a diagram showing a designing method of the aspherical cemented lens in accordance with the present invention.

The basic structure of the present invention utilizes these relations, and when a plurality of interfaces are arranged, it is possible to converge the light flux to a single point by making parallel the light fluxes traveling through the regions in every other region. With reference to FIG. 2, a case where there are four regions and three interfaces is considered. Assuming that the light flux traveling through the first region is parallel to the optical axis, the light flux can be converged at single point by making the light flux traveling in the third region should be parallel to the optical axis. When the first region and the fourth region are air, the lens itself becomes a cemented lens formed of two kinds of glasses having different refractive indices. The conditions for refracting the light flux traveling parallel to the optical axis in the first region at the first interface so as to converge to the point at the distance Lz1 from the first interface are as follows.

$$r1 = Lz1 \cdot (n2-n1)/n2$$

$$k1 = -(n1/n2)^2$$

Since the light flux refracted at the first interface and incident into the second region can be regarded as a light flux emitted from a light source at the position of the image of the first interface, the conditions for refracting the light flux at the second interface to make the light flux traveling through the third region parallel to the optical axis are as follows.

$$r2 = (L2-Lz1) \cdot (n3-n2)/n2$$

$$k2 = -(n3/n2)^2$$

The conditions to converge the light flux which is parallel to the optical axis again in the third region to the point of distance Lz3 from the third interface are as follows.

$$r3 = Lz3 \cdot (n4-n3)/n4$$

$$k3 = -(n3/n4)^2$$

Assuming that Lz1 in the equation of r2 at the second interface is equal that in the equation of r1 of the first interface, the relationship between r1 and r2 is derived.

$$r1 = L2 \cdot (n2-n1)/n2 - r2 \cdot (n2-n1)/(n3-n2)$$

This is the condition for refracting the light flux parallel to the optical axis again at the second interface, when the light flux parallel to the optical axis is incident on the first interface. By satisfying this condition and the conditions of the conic constant "k" at each interface, the light flux incident on the first interface parallel to the optical axis is converged to a single point, and the spherical aberration is completely corrected.

Incidentally, the lens configuration having these three interfaces is similar to that of a normal achromatic lens, and chromatic aberration can be corrected. Specifically, the values of the curvature radii r1 and r2 are varied simultaneously by adjusting the value of the distance Lz1 from the first interface, so that the converging positions (the distance Lz3 from the third interface) of the light fluxes having different wavelengths are approximated. At this time, since the spherical aberration is completely corrected at the design wavelength, it is sufficient to consider only the chromatic aberration, and thus, the types of usable glasses can be greatly increased, and the design of the lens becomes easy. Furthermore, it is also possible to realize a plastic achromatic lens (spherical aberration is corrected) which is usually considered to be difficult. A lens that can converge the light flux to a single point at the design wavelength in accordance with the basic configuration of the present invention is termed as an Achromatic Convergeable Conioids Lens (hereinafter, abbreviated as ACC lens).

This ACC lens can converge the light flux parallel to the optical axis at a single point completely at the design wavelength, and can converge the light fluxes in the vicinity of the point even at other wavelengths, and also the ACC lens can be used in various applications, if a slight aberration can be allowable. Therefore, the range where aberration by deviating from the condition of the ACC lens can be allowable will be considered.

The ACC lens can be regarded as a combination of an achromatic lens and a condenser lens whose exit surface is an aspherical surface, roughly. However, it is not merely the combination of these, the ACC lens comprises characteristics of separation of the interfaces for achromatization (first interface and second interface) and the interface for focusing (third interface) by refracting the light flux incident on the incident surface (first interface) to be parallel to the optical axis again at the cementing surface (second interface and thus, it enables to realize the achromatic lens by selecting the optimum materials among a wide range of materials. Hereupon, the important matter is not to make the light flux be parallel to the optical axis in the midway of the optical path, but to separate correction of chromatic aberration and focusing of the light flux. In the ACC lens, chromatic aberration is corrected at the two interfaces in front side among the three interfaces and by making the exit surface hyperboloid, the light flux is converged to a single point only on this surface Based on these, the requirements of the present invention are as following four conditions:
(1) having at least three interfaces;
(2) when three interfaces are defined as a third interface, a second interface and a first interface in order from a light exit surface, chromatic aberration is corrected at the first interface and the second interface;
(3) the third interface is a hyperboloid or a surface close to a hyperboloid; and
(4) when light flux is incident on the first interface parallel to the optical axis, the light flux exit from the third interface converges to almost a single point.

In order to correct chromatic aberration, the first interface and the second interface must be curved surfaces.

Subsequently, "the surface close to the hyperboloid" in (3) above is considered. As is well known, even if light beam which does not converge to the single point exists in a part of the light flux exit from the exit surface, an image can be formed though the contrast is lowered. Then, a ratio of effective range of the exit surface (the third interface), that is, a ratio of light fluxes which contribute image formation to all pass through light fluxes is determined as an area ratio of the available range of the exit surface by using MTF. Although the required MTF varies depending on the application, in general camera lenses, if the MTF characteristic at a spatial frequency 10 lines/mm is 80% or more, it is regarded as an excellent lens, and if the MTF characteristic is 60% or more, satisfactory image quality can be obtained. (See http://cweb.canon.jp/ef/knowledge/).

Figure 3:
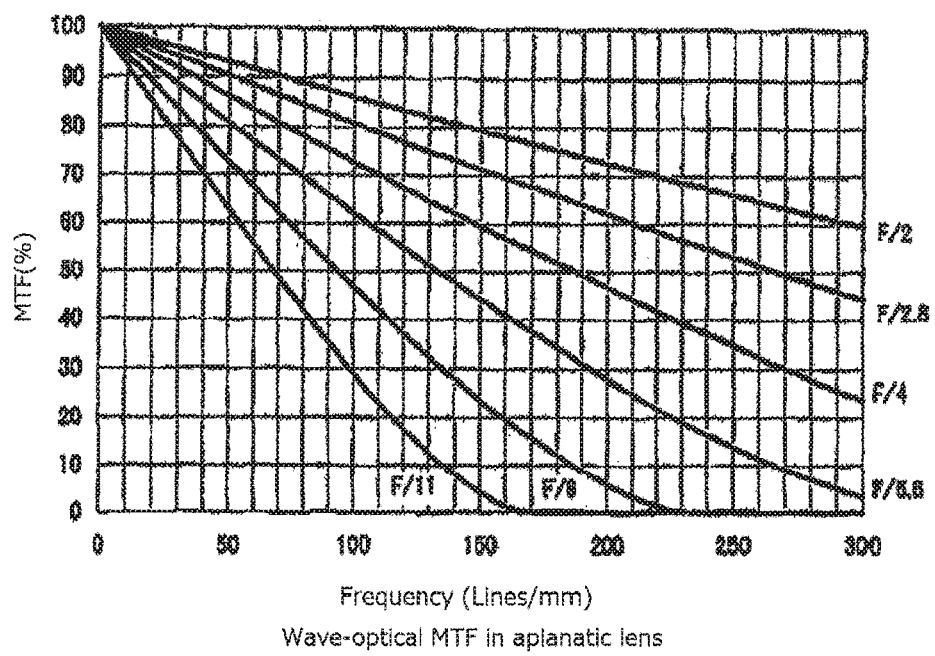
FIG. 3 is a graph showing a wave-optical MTF in an aplanatic lens.

Referring to the wave optical MTF in the aplanatic lens disclosed in Japanese Patent Application Laid-Open No. 2009-147925, as shown in FIG. 3, for example, the theoretical value of the MTF is about 95% or more at the spatial frequency 10 lines/mm when the aperture value (f-number) is equal to or smaller than f8 used very often. Assuming the difference between the theoretical value and the satisfactory value, that is, descent 95%-60%=35% is allowable, it is necessary that at least 65% or more of the effective region has good convergence and contributes to image formation.

Figure 4:
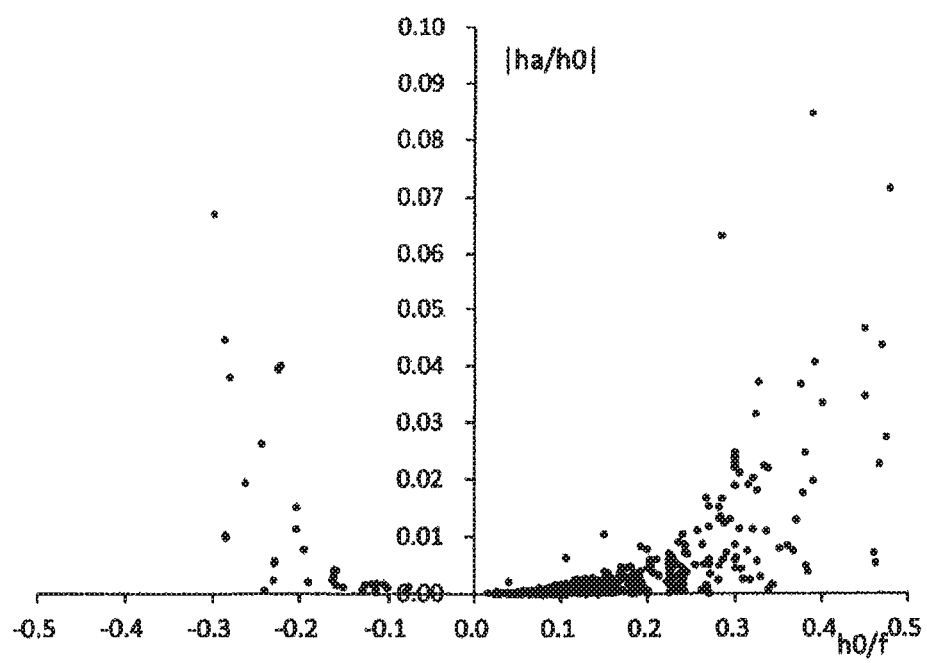
FIG. 4 is a graph on which published data of approximately 600 types of commercially available achromatic lenses for visible light are plotted.
Figure 5:
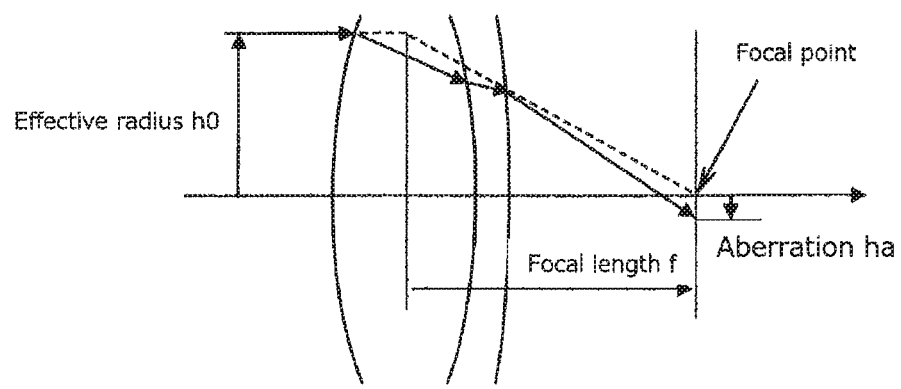
FIG. 5 is a diagram showing a relationship between variables used in FIG. 4.

Deviation from an ideal hyperboloid is discussed. Since the third interface (exit surface) in the aspherical cemented lens in accordance with the present invention is basically a hyperboloidal surface, an allowable range of the conic constant k3 representing its characteristic will be examined. FIG. 4 is a graph on which published data of approximately 600 types of commercially available achromatic lenses for visible light are plotted. As shown in FIG. 5, assuming that an effective radius of the lens is h0, a focal length is 'f', an aberration at the focal position of the d-line incident at a position having a height of the effective radius parallel to the optical axis is ha, abscissa represents $h0/f$, and ordinate represents $|h/h0|$ in FIG. 4. In FIG. 4, the more the position of the plot goes to right hand, the stronger refractive power the convex lens has, and the more the position of the plot goes to left hand, the stronger refractive power the concave lens has. Although, it seems that there are some lenses in which an aberration at a position slightly inner side from the end of effective radius is larger than that at the end, among these lenses, all in all, the upper limit of the positions of the plots can be regarded as limit of allowable range in the current usage.

Figure 6:
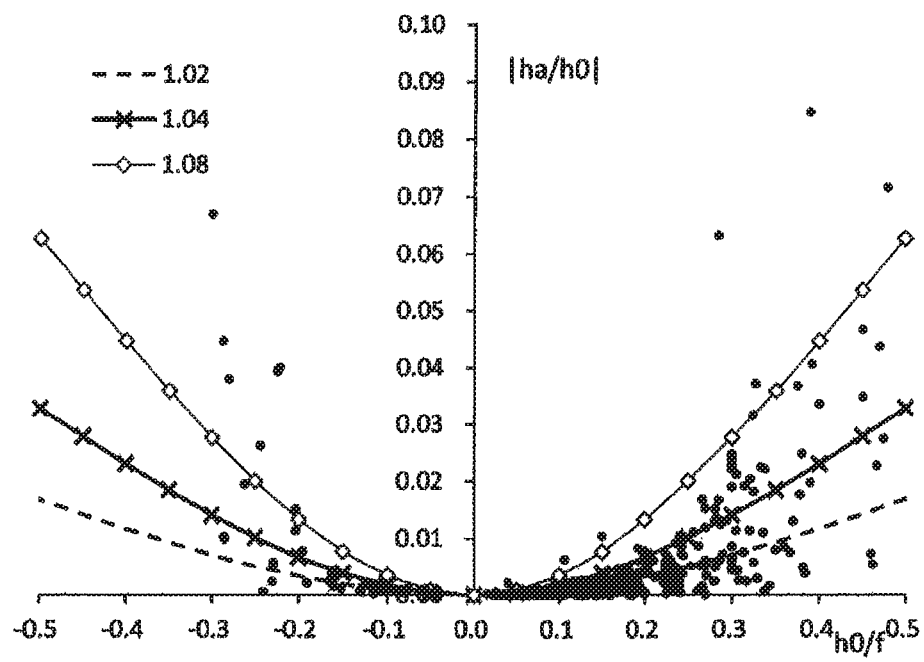
FIG. 6 is a graph in which increments of aberration with changing the conic constant k3 of the third interface of the aspherical cemented lens in accordance with the present invention are superimposed on the plots of FIG. 4
Figure 7:
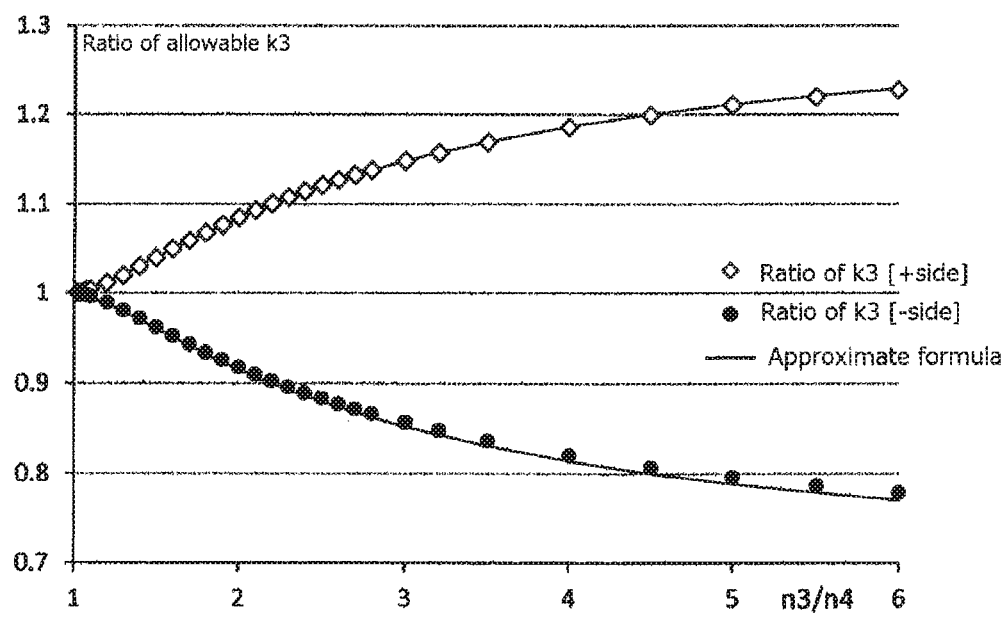
FIG. 7 is a graph showing variation of ratio of allowable conic constant k3 when the ratio n3/n4 of the refractive index n3 in the region between the second interface and the third interface and the refractive index n4 behind the third interface (image side) is varied.

By using this, the allowable range of the conic constant k3 is examined, in case that the light flux is incident on the third interface of the aspherical cemented lens in accordance with the present invention parallel to the optical axis. For example, when n3/n4=1 . . . 5, in order to converge the light flux at a single point completely, the condition k3=−2.25 is required. Then, it is examined how much the aberration increases when the conic constant k3 is varied. FIG. 6 shows the result of similar calculations with the conic constant k3 set to 1.02 times, 1.04 times and 1.08 times in the case of n3/n4=1.5, and superimposed on the plots of FIG. 4. In these cases, the aberration of the light beam incident on the end of the effective radius becomes the largest. It is calculated on the basis of assumption that h0 is the incident height of the light beam on the third interface and the focal length is decided only by the third interface. As can be seen from FIG. 6, if the value of k3 is 1.04 times or less, it can be used in the whole range of $h0/f$. Since this value varies depending on the value of n3/n4, the value of k3 is examined with changing the value of n3/n4 for the case of h0/f=0.25 and |ha/h0|=0.01, FIG. 7 also shows the values according to the approximate expression given by A below.

Although it is slightly different between the case where the value of the conic constant k3 varies to the larger side and the case where the conic constant k3 varies to the smaller side, when it is substituted by the approximate expression of the larger side, it is necessary that k3 is in the following range.

Allowable range of k3=k3·(1±A)

$$A=0.325-(n4/n3-1)^2+0.0035$$

It was found that hyperbolic curves within this range can be used, and even if it is not a perfect hyperbola, when it is a curve close to the perfect hyperbola, it can be considered usable within the same range. Therefore, in conjunction with the above area ratio, the area of 65% or more of the effective area of the third interface must be included in the above allowable range of the hyperbolic curve.

Depending on the application, the light flux may not be converged to the single point for the purpose of reducing other aberrations, or when the light flux traveling in the third region is not completely parallel to the optical axis such as a case where the first interface and the second interface are substituted with spherical surfaces, convergence may sometimes be improved by modifying the conic constant k3. Therefore, the conic constant k3 may deviate from $-(n3/n4)^2$, which is the theoretical value of the ACC lens, and when it deviates greatly, the convergence becomes worse. In that case, it will be approximated within the above mentioned allowable range around the modified value.

When the light flux parallel to the optical axis is incident on the first interface and converged to a single point, the allowable range of aberration can be determined by referring to the above mentioned MTF of the camera lens, it is preferable that the MTF of spatial frequency 10 lines/mm is 60% or more in usable frequency range, and, in general, it means that chromatic aberration is corrected as well.

In addition, although the ACC lens is designed so that when a light flux parallel to the optical axis is incident on the first interface, the light flux is converged to a single point, the incident light flux needs not to be parallel to the optical axis in practical use.

Embodiment 1

FIG. 8(a) shows an ACC lens using acrylic (PMMA) and polycarbonate (PC), which are most commonly used as optical materials of resin, and FIGS. 8(b) and 8(c) show the structures of an achromatic lens and a precise aspherical achromatic lens manufactured by Edmund Optics as comparative examples. Tables 1 to 3 show specifications of the above mentioned lenses. The first region and the fourth region are air (n1=n4=1); the focal length f=25 mm, and the diameter of the light flux incident on the first interface is 22.5 mm. For the refractive indices of PMMA and PC, the calculation formula of RefractiveIndex.INFO (http://refractiveindex.info) was used. In Table 3, q4 to q14 are higher order aspherical coefficients.

TABLE 1

The present invention (ACC lens)

| | | Region or Interface | | |
|---|---|---|---|---|
| | | 1 | 2 | 3 |
| | Material | Air | PC | PMMA |
| | Distance (Thickness) | | 2 | 12 |
| | r Radius of Curvature | 112.541662562079 | 18.0039659403808 | −12.1844186844845 |
| k | Conic Constant | −0.398174809453036 | −0.884692562055045 | −2.22186974427219 |
| q4 | 4th Coefficient | | | |
| q6 | 6th Coefficient | | | |
| q8 | 8th Coefficient | | | |
| q10 | 10th Coefficient | | | |
| q12 | 12th Coefficient | | | |
| q14 | 14th Coefficient | | | |

TABLE 2

Achromatic lens (#65-553)

| | | Region or Interface | | |
|---|---|---|---|---|
| | | 1 | 2 | 3 |
| | Material | Air | N-BASF64 | N-SF66 |
| | Distance (Thickness) | | 15.33 | 5 |
| | r Radius of Curvature | 18.85 | −13.84 | −41.7 |
| k | Conic Constant | | | |
| q4 | 4th Coefficient | | | |
| q6 | 6th Coefficient | | | |
| q8 | 8th Coefficient | | | |
| q10 | 10th Coefficient | | | |
| q12 | 12th Coefficient | | | |
| q14 | 14th Coefficient | | | |

TABLE 3

Precise aspherical achromatic lens (#85-302)

| | Region or Interface | | |
|---|---|---|---|
| | 1 | 2 | 3 |
| Material | Air | N-PK51 | S-NPH2 |
| Distance (Thickness) | | 17 | 8 |
| r Radius of Curvature | 19.077 | −14.314 | −19.306 |
| k Conic Constant | −0.6674385031746 | | −0.0945286373294 |
| q4 4th Coefficient | −9.564263630363E−06 | | 6.343140770192E−06 |
| q6 6th Coefficient | −2.118952653071E−08 | | 3.046454058250E−08 |
| q8 8th Coefficient | −6.377245653240E−10 | | 1.724317282607E−10 |
| q10 10th Coefficient | 5.787152551437E−12 | | −3.501530908300E−12 |
| q12 12th Coefficient | −3.146406217309E−14 | | 2.059220483178E−14 |
| q14 14th Coefficient | 7.077359219339E−17 | | −4.199293683954E−17 |

In the ACC lens of Embodiment 1, the arrangement of the convex lens and the concave lens are reversed in comparison with that of the conventional achromatic lens. This is because the PC lens with a large refractive index is arranged anterior. If the PMMA lens with a low refractive index is arranged anterior, it is arranged in the same way as the conventional achromatic lens. However, in the ACC lens, it is the exit surface ((the third interface) that largely refracts the light flux, and in general, the material with a lower refractive index has a smaller chromatic dispersion, so that it is preferable to arrange the PMMA lens with a smaller refractive index posterior. Furthermore, since the refraction at the first interface is used for correcting chromatic aberration and the light flux is converged by refraction at the third interface, it is necessary to increase the refractive power of the third interface. The degree of refraction at each interface can be understood by comparing the position of the image formed by the refraction at the interface, that is, the values of Lz1 and Lz3. The smaller the absolute values of Lz1 and Lz3 become, the larger the refractive power becomes. In the ACC lens, since it is usually Lz1>5Lz3, the following relation is derived.

$$|r1 \cdot n2/(n2-n1)| > 5 \cdot |r3 \cdot n4/(n4-n3)|$$

When n1=n4=1 and both n2 and n3 are nearly 1.5, since $|3 \cdot r1| > |10 \cdot r3|$, the value of $|r1|$ becomes about 3 times as large as the value of $|r3|$. In the first embodiment, the ratio of the radius of curvature is about nine times, and as a whole, the shape is close to that of a plano-convex lens. In ordinary achromatic lenses, in contrast to this, the relation becomes $|r1|<|r3|$.

FIG. 9 shows how light fluxes are converged by each lens. These are the synthesis of r-line, C-line, d-line, g-line (the same applies below). The spot diagram and the image intensity curve are scaled differently. As can be seen from FIG. 9, the ACC lens using inexpensive resins has higher convergence than the expensive precision aspherical achromatic lens. The MTF of the ACC lens of Embodiment 1 is about 91% at a spatial frequency of 10 lines/mm.

Embodiment 2

In the aspheric lens, it is known that coma aberration appears when the incident light flux is tilted from the optical axis. Although coma aberration appears also in the ACC lens of the present invention, unlike the aspheric lens using a high order aspheric coefficient and having high convergence, since the shape of the aspheric surface of the ACC lens is simple, it becomes clean coma aberration (substantially in accordance with theory). If coma aberration exists, it seems to be a defect in general because it draws a large tail, but it will be an advantage when used as follows.

In Embodiment 2, two ACC lenses of the same configuration are used, and a relay lens is configured by symmetrically arranging them in a manner that the light flux between the two ACC lenses be parallel to the optical axis. FIG. 10(a) shows a configuration of a relay lens in which two ACC lenses are arranged symmetrically, and FIG. 10(b) shows a configuration of a commercially available achromatic relay lens (#46-000 manufactured by Edmund Optics Inc.).

It is known that when the lenses of the same configuration are arranged symmetrically, some aberrations such as coma are corrected. Since the ACC lens of the present invention has high convergence and simple coma aberration, it is easy to correct aberrations. In addition, when two ACC lenses of the same configuration are arranged symmetrically, both the incident surface and the exit surface are hyperboloidal surfaces, so that it also has an effect of correcting field curvature. When the light flux mainly refracts at the incident surface and the exit surface and the incident surface and the exit surface are spherical, the larger the inclination of the incident light flux inclines from the optical axis, the more the image surface is curved inward (direction toward the lens). On the other hand, in the arrangement of the embodiment 2, both the incident surface and the exit surface are hyperboloidal surfaces, so that the larger the incident light flux inclines, the larger the ratio of the light flux passing through the portion having the large curvature radius becomes. Therefore, the distance at which the image can be formed when the incident light flux is inclined becomes longer, and thus, the image is curved outward (direction away from the lens). By designing these properties so as to cancel each other, it is possible to increase the convergence by reducing the curvature of field for the light flux incident obliquely. In general, the PC is relatively degraded by ultraviolet rays, but in the arrangement of the second embodiment, since the PC lens is disposed on the inner side and the PMMA lens is disposed on the outer side, so that ultraviolet rays are absorbed by the outer PMMA lens, and thus, the light resistance is improved as a whole.

Tables 4 and 5 show the specifications of the above-mentioned lenses. Distances from the object to the lens and effective diameter of the lens (9.5 mm) were aligned. FIG. 11(a) shows the angle dependency of MTF of the relay lens in which the two ACC lenses are arranged symmetrically, and FIG. 11(b) shows the angle dependence of MTF of the commercially available achromatic relay lens. In FIGS. 11(a) and 11(b), the MTFs of the spatial frequencies of 10 lines/mm, 30 lines/min and 50 lines/mm are shown in order from the top, the solid line indicates the sagittal direction, and the broken line indicates the meridional direction. (The same applies below.)

TABLE 4

Relay lens with lenses of the present invention (ACC lenses)

| Region or Interface | Material | Distance (Thickness) | r Radius of Curvature | k Conic Constant |
|---|---|---|---|---|
| 1 | Air | 37.5583 | 18.4258675 | -2.221869744 |
| 2 | PMMA | 3.5 | -20.7966603 | -0.884692562 |
| 3 | PC | 1.3 | -129.6258559 | -0.398174809 |
| 4 | Air | 10 | 129.6258559 | -0.398174809 |
| 5 | PC | 1.3 | 20.7966603 | -0.884692562 |
| 6 | PMMA | 3.5 | 18.4258675 | -2.221869744 |
| 7 | Air | 37.5583 | | |

TABLE 5

Achromatic relay lens (#46-000)

| Region or Interface | Material | Distance (Thickness) | r Radius of Curvature | k Conic Constant |
|---|---|---|---|---|
| 1 | Air | 37.5583 | 51.17 | |
| 2 | SF5 | 1.33 | 18.01 | |
| 3 | BK7 | 3.73 | -24.77 | |
| 4 | Air | 2.76 | 24.77 | |
| 5 | BK7 | 3.73 | -18.01 | |
| 6 | SF5 | 1.33 | -51.17 | |
| 7 | Air | 37.5583 | | |

As can be seen from FIG. 11, since the relay lens in which two ACC lenses are arranged symmetrically adopts aspherical surfaces as the incident surface, the exit surface, and so on, it is obvious that the convergence is high near the incident angle of 0 degree, in comparison with that of the commercially available achromatic relay lens which adopts only spherical surfaces, as a matter of course, in addition, it is understood that the decrease of MTF is small even if the incident light flux is inclined. This shows the advantages of symmetrically arranging the ACC lenses.

Embodiment 3

Embodiment 3 shows another configuration of the relay lens. In the Embodiment 2, the case where all the interfaces of the two ACC lenses are aspherical is shown. In the Embodiment 3, as shown in FIG. 12, interfaces (the first interface and the second interface in FIG. 8(a)) other than the outermost surface of the two ACC lenses (the incident surface and the exit surfaces as a relay lens) are spherical surfaces. In this case, the light flux incident on the exit surface is not completely parallel to the optical axis, so that the conic constants k3 of the incident surface and the exit surface are modified. In case that the light flux is not necessarily converged completely to a single point, even though the interfaces other than the incident surface and the exit surface of the two ACC lenses constituting the relay lens are formed into spherical surfaces, it is possible to obtain the same characteristics as those of the ACC lens in which all interfaces are aspherical including the incident surface and the exit surface by modifying the conic constants of the incident surface and the exit surface. Table 6 shows the specification of the relay lens shown in FIG. 12. FIG. 13 shows the angle dependence of MTF of the relay lens shown in FIG. 12.

TABLE 6

Relay lens with lenses of the present invention (having spherical surfaces other than outermost surfaces)

| Region or Interface | Material | Distance (Thickness) | r Radius of Curvature | k Conic Constant |
|---|---|---|---|---|
| 1 | Air | 37.5583 | 18.4258675 | -2.1 |
| 2 | PMMA | 3.5 | -20.7966603 | |
| 3 | PC | 1.3 | -129.6258559 | |
| 4 | Air | 10 | 129.6258559 | |
| 5 | PC | 1.3 | 20.7966603 | |
| 6 | PMMA | 3.5 | -18.4258675 | -2.1 |
| 7 | Air | 37.5583 | | |

Embodiment 4

Embodiment 4 shows still another configuration of the relay lens. In the Embodiment 4, as shown in FIG. 14, the region between the two ACC lenses is BK7 (in other word, a biconvex lens of BK7 is cemented). In the configuration of FIG. 14, the sign of the interfaces for correcting chromatic aberration are changed, and the shape of the PMMA lens is a meniscus lens. Table 7 shows the specifications of the relay lens shown in FIG. 14. Furthermore, FIG. 15 shows the angle dependence of MTF of the relay lens shown in FIG. 14.

TABLE 7

Relay lens with lenses of the present invention (with BK7 at the center thereof)

| Region or Interface | Material | Distance (Thickness) | r Radius of Curvature | k Conic Constant |
|---|---|---|---|---|
| 1 | Air | 37.5583 | 18.4258675 | -2.221869744 |
| 2 | PMMA | 9 | 11.8838059 | -0.884692562 |
| 3 | PC | 1.5 | 8.5123923 | -0.916071826 |
| 4 | N-BK7 | 6 | -8.5123923 | -0.916071826 |
| 5 | PC | 1.5 | -11.8838059 | -0.884692562 |
| 6 | PMMA | 9 | -18.4258675 | -2.221869744 |
| 7 | Air | 37.5583 | | |

In comparison with FIG. 11(a) and FIG. 15, it can be found that the convergence for inclined incident light flux in the meridional direction is improved by cementing the biconvex lens of BK7 between the two ACC lenses as in Embodiment 4, although the convergence on the optical axis is lowered when compared with the case where air is filled between the two ACC lenses.

Embodiment 5

Figure 16:
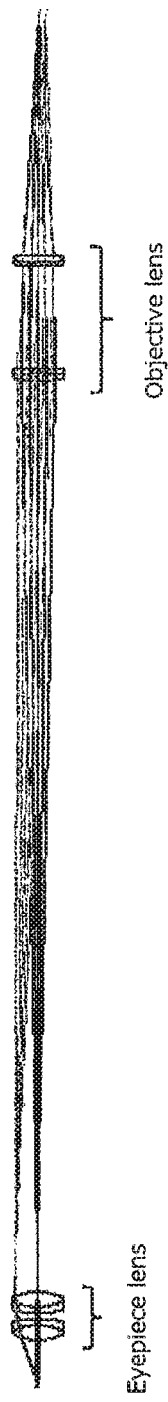
FIG. 16 is a diagram showing a configuration of a microscope in which two aspherical cemented lenses in accordance with the present invention are symmetrically arranged as an objective lens and an eyepiece lens, respectively.

In the configuration as described above in which the two ACC lenses are symmetrically arranged, the tight flux can theoretically converge to a single point at the design wavelength. However, it is often not required the convergence to that extent, actually. For example, when the image field is curved and defocusing is performed in the curved direction of the image field while reducing the convergence in the vicinity of the optical axis within an allowable range, the usable angle range is widened. Also, even if the symmetry of the arrangement of the two ACC lenses is somewhat disrupted, good results may be obtained in some cases. In Embodiment 5, FIG. 16 shows a microscope having a magnification of 30 times combined with an objective lens having a magnification of -3 and an eyepiece lens having a magnification of 10 (virtual image), and the objective lens and the eyepiece lens are respectively configured by arranging two ACC lenses symmetrically. Although this eyepiece lens is similar in construction to the eyepiece of the Plößl-type which has relatively good properties in spite of its simple structure, the disposition of the convex lens and the concave lens is reversed. Table 8 shows the specifications of the respective lenses constituting the microscope of Embodiment 5.

TABLE 8

Microscope with lenses of the present invention

| Region or Interface | Material | Distance (Thickness) | r Radius of Curvature | k Conic Constant | |
|---|---|---|---|---|---|
| 1 | Air | 100 | 80.6229194 | −2.221869744 | Objective Lens |
| 2 | PMMA | 3 | −88.1869075 | −0.884692562 | |
| 3 | PC | 1.5 | −548.1895549 | −0.398174809 | |
| 4 | Air | 43 | 548.1895549 | −0.398174809 | |
| 5 | PC | 1.5 | 88.1869075 | −0.884692562 | |
| 6 | PMMA | 3 | −80.6229194 | −2.221869744 | |
| 7 | Air | 371.5682 | 20.3969745 | −2.221869744 | Eyepiece Lens |
| 8 | PMMA | 6 | −20.8788070 | −0.884692562 | |
| 9 | PC | 2.1 | −130.4311740 | −0.398174809 | |
| 10 | Air | 3 | 130.4311740 | −0.398174809 | |
| 11 | PC | 2.1 | 20.8788070 | −0.884692562 | |
| 12 | PMMA | 6 | −20.3969745 | −2.221869744 | |
| 13 | Air | 18 | | | Eye Relief |

Figure 17:
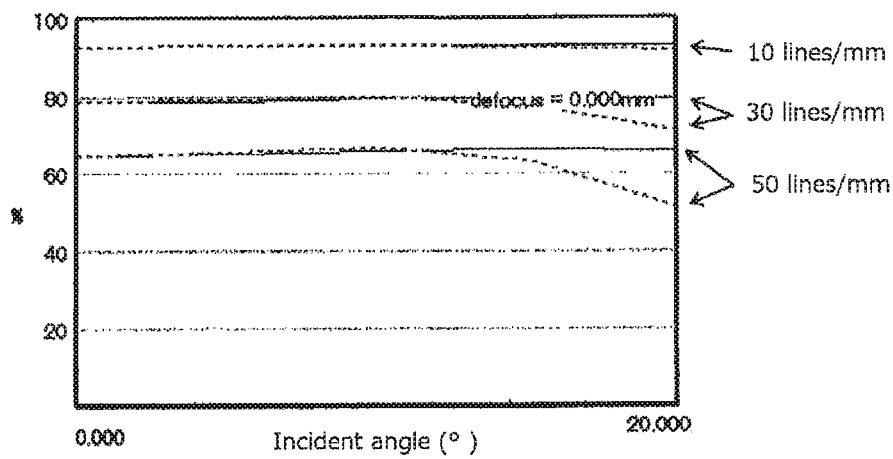
FIG. 17 is a graph showing angle dependency of MTF of the microscope shown FIG. 16.

As shown in Table 8, in Embodiment 5, all interfaces are aspherical. FIG. 17 shows the angle dependency of MTF of the microscope of Embodiment 5. As described above, the microscope of Embodiment 5 is configured by merely combining two kinds of resin-made cemented lenses, but the angle dependence of MTF is very excellent. The ACC lenses of the present invention are designed so as to eliminate spherical aberration when light flux is incident on the incident surface parallel to the optical axis. However, as described above, the ACC lens can perform sufficient optical characteristics even when the light flux is incident on the incident surface not parallel to the optical axis.

Embodiment 6

Figure 18:
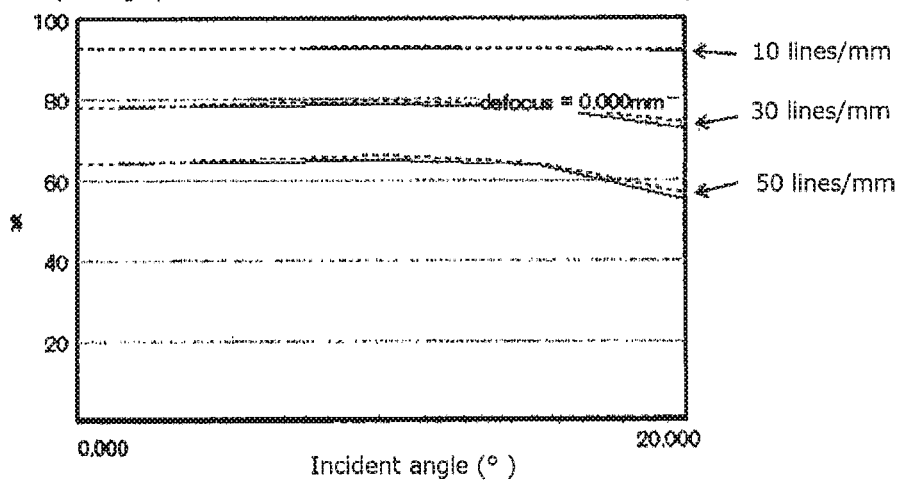
FIG. 18 is a graph showing angle dependence of MTF of a microscope in which an objective lens and an eyepiece lens are respectively configured of two aspherical cemented lenses in accordance with the present invention arranged symmetrically and having spherical surfaces other than the outermost surfaces.

Embodiment 6 shows a microscope in which an objective lens and an eyepiece lens are symmetrically arranged in each of the aspherical cemented lenses in accordance with the present invention in the same manner as in the fifth embodiment described above, but in two pairs of the lenses which constitute the objective lens and the eyepiece lens, interfaces other than the incident surface and the exit surface (outermost surfaces) are spherical surfaces. Table 9 shows the specifications of the lenses constituting the microscope of Embodiment 6, and FIG. 18 shows the angle dependency of MTF of the microscope of Embodiment 6. As can be seen from FIG. 18, the same result as in Embodiment 5 can be obtained even if the interfaces other than the incident surface and the exit surface are made spherical surfaces.

TABLE 9

Microscope with lenses of the present invention
(having spherical surfaces other than outermost surfaces)

| Region or Interface | Material | Distance (Thickness) | r Radius of Curvature | k Conic Constant | |
|---|---|---|---|---|---|
| 1 | Air | 100 | 80.6229194 | −2.1 | Objective Lens |
| 2 | PMMA | 3 | −88.1869075 | | |
| 3 | PC | 1.5 | −548.1895549 | | |
| 4 | Air | 43 | 548.1895549 | | |
| 5 | PC | 1.5 | 88.1869075 | | |
| 6 | PMMA | 3 | −80.6229194 | −2.1 | |
| 7 | Air | 371.5682 | 20.3969745 | −2.1 | Eyepiece Lens |
| 8 | PMMA | 6 | −20.8788070 | | |
| 9 | PC | 2.1 | −130.4311740 | | |
| 10 | Air | 3 | 130.4311740 | | |
| 11 | PC | 2.1 | 20.8788070 | | |
| 12 | PMMA | 6 | −20.3969745 | −2.1 | |
| 13 | Air | 18 | | | Eye Relief |

REFERENCE EXAMPLE

Figure 19:
FIG. 19 is a diagram showing a configuration of a microscope described in Japanese Patent Application Laid-Open No. 2013-92658 as a reference example.
Figure 20:
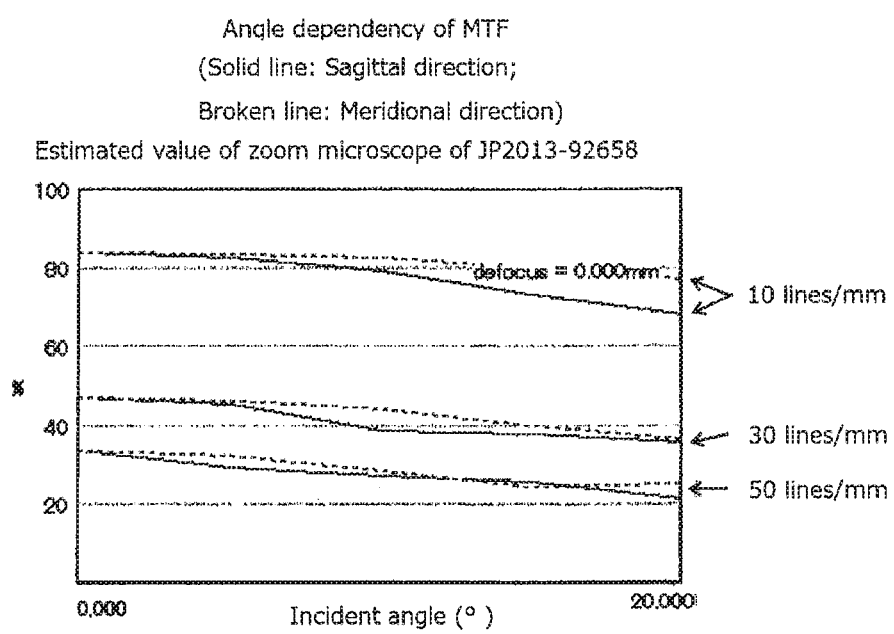
FIG. 20 is a graph showing angle dependency of MTF of the reference example shown in FIG. 19.

As a reference example, FIG. 19 shows a configuration of a microscope described in Japanese Patent Application Laid-open No. 2013-92658, and FIG. 20 shows the angle dependence of MTF when the magnification thereof is set to 30 times. Since there is no lens interval data, it is based on the estimated values. Compared with this reference example, it can be seen that the MTF of the microscopes of Embodiment 5 and Embodiment 6 is remarkably improved though they have the simple structures.

The Embodiments 5 and 6 show the case of the microscope, and their configuration using the objective lens and the eyepiece is the same for the telephoto lens, so that it is possible to design in the same way merely by changing the distance between the object and the objective lens. Though, it is not illustrated and described the configuration and lens specifications of the telescope, excellent characteristics can also be obtained by using the ACC lenses of the present invention arranged symmetrically, too.

The invention claimed is:
1. An aspherical cemented lens comprising at least three interfaces, wherein
when three interfaces are defined as a third interface, a second interface and a first interface in order from a light exit surface, the first interface and the second interface are curved surfaces;
when a light beam is incident on the first interface parallel to the optical axis thereof, chromatic aberration is corrected at the first interface and the second interface, and the light beam is converged at the third interface;

when a main portion (a portion most contributing to convergence of light flux) of the third interface is approximated by a hyperbola, a radius of curvature of the hyperbola is defined as r3, a conic constant of the hyperbola is defined as k3, a refractive index in a region between the second interface and the third interfaces is defined as n3, a refractive index in a region behind the third interface (image side) is defined as n4, and a correction coefficient is defined as A, a portion of 65% or more of an effective region (a region through which the light flux passes) of the third interface is included in a scope between a hyperbola represented by a conic constant $k3'=k3\cdot(1-A)$ with a radius of curvature $r3$ (1), and a hyperbola represented by a conic constant $k3''=k3\cdot(1-A)$ with a curvature radius $r3$ (2), where $A=0.325\cdot(n4/n3-1)^2+0.0035$.

2. The aspherical cemented lens in accordance with claim 1, wherein the first interface and the second interface are aspherical surfaces represented by only a radius of curvature and a conic constant and having no higher order aspherical coefficient.

3. The aspherical cemented lens in accordance with claim 1, wherein two of any one of the above-mentioned aspherical cemented lenses having the same configuration may be arranged symmetrically.

4. The aspherical cemented lens in accordance with claim 2, wherein two of any one of the above-mentioned aspherical cemented lenses having the same configuration may be arranged symmetrically.

* * * * *